United States Patent
Tzoreff et al.

(10) Patent No.: US 8,472,873 B2
(45) Date of Patent: Jun. 25, 2013

(54) NEAR FIELD COMMUNICATION AND FREQUENCY MODULATION COEXISTENCE CONCEALMENT SYSTEM AND METHOD

(75) Inventors: Yaniv Tzoreff, Jerusalem (IL); Keren Dor, Herzelia (IL); Eli Dekel, Tzur Igal (IL)

(73) Assignee: Texas Instruments Incorporated, Dallas, TX (US)

( * ) Notice: Subject to any disclaimer, the term of this patent is extended or adjusted under 35 U.S.C. 154(b) by 270 days.

(21) Appl. No.: 12/932,205

(22) Filed: Feb. 18, 2011

(65) Prior Publication Data

US 2012/0214409 A1     Aug. 23, 2012

(51) Int. Cl.
*H04B 5/00* (2006.01)

(52) U.S. Cl.
USPC ........................................... 455/41.1

(58) Field of Classification Search
USPC .. 455/41.1, 41.2, 156.1, 565, 63.1; 340/854.8
See application file for complete search history.

(56) References Cited

U.S. PATENT DOCUMENTS

| | | | |
|---|---|---|---|
| 2005/0119016 A1* | 6/2005 | Neumann | 455/466 |
| 2006/0089168 A1* | 4/2006 | Ueda | 455/550.1 |
| 2007/0032261 A1* | 2/2007 | Boyer et al. | 455/550.1 |
| 2007/0135036 A1* | 6/2007 | Badt, Jr. | 455/1 |
| 2008/0122582 A1* | 5/2008 | Baker et al. | 340/10.5 |
| 2008/0220786 A1* | 9/2008 | Beacham | 455/450 |
| 2010/0245035 A1* | 9/2010 | Jeon et al. | 340/5.8 |
| 2010/0278324 A1* | 11/2010 | Radziewicz et al. | 379/207.16 |

* cited by examiner

*Primary Examiner* — Zhiyu Lu
(74) *Attorney, Agent, or Firm* — Ronald O. Neerings; Wade James Brady, III; Frederick J. Telecky, Jr.

(57) ABSTRACT

A system for determining a frequency modulated audio output of a mobile communication device during a near field communication transaction includes a transceiver providing a first frequency modulated audio signal. The device also is configured to determine when the near field communication transaction is occurring; a memory configured to store a replacement sound; and a selection circuit coupled with the transceiver and the memory to select the replacement sound when the near field communication transaction is occurring and select the first frequency modulated audio signal when the near field communication transaction is not occurring. There is also a signal path coupled with the selection circuit and configured to provide a second frequency modulated signal based on the selection circuit. In this way, the replacement sound is the audio output when the NFC transaction is occurring and the regular audio is output when the NFC transaction is not occurring.

14 Claims, 1 Drawing Sheet

NEAR FIELD COMMUNICATION AND FREQUENCY MODULATION COEXISTENCE CONCEALMENT SYSTEM AND METHOD

BACKGROUND

1. Field

The present invention relates generally to near field communication and, more particularly, to improving coexistence of other communication signals in the presence of a near field communication transaction.

2. Description of Related Art

Near Field Communication (NFC) promises to create a new paradigm of use for many cell phone users. What can be viewed as the confluence of RFID and cellular telephony will bring a number of new applications that vary from security applications, human interface applications, and payment services. With NFC, the cellular telephone becomes a magic wand that where you point, when you point, or at whom you point all tell the cell phone what it is intended to do.

The use of portable electronic devices and mobile communication devices has increased dramatically in recent years. Moreover, the demand for mobile devices that allow users to conduct contactless transactions is increasing. Near Field Communication technology (NFC) enables mobile devices to act as an electronic data transaction device. As one example, NFC can be used to perform contactless financial transactions such as those requiring a credit card. The user may select credit card information stored in the mobile device and perform contactless payments in a quick way by "tapping" or "waving" the mobile device in front of a contactless reader terminal. A reader terminal can read the credit card information and process a financial transaction. NFC can be coupled with an UICC (Universal Integrated Circuit Card) chip card used in mobile terminals in GSM (Global System for Mobile), UMTS (Universal Mobile Telecommunications System) or other networks to provide contactless payment transactions.

NFC technology on the other hand is being used in a wide array of applications including "fast-lane" payment at gas stations and supermarkets, for transit payments, and more. The mobile phone industry including governments have also moved forward in delivering services such as credit-card payments, Mobile Time Reporting, Smart Parking, Smart Theater for tickets with smart posters for information distribution, Information Tags in Restaurants for payment and ordering using hand-held devices, enabling Buses and Bus Stops with information and tickets, etc. This technology is already being used for services such as mobile ticketing and used to replace plastic credit and debit cards in consumers' pockets around the world.

One anticipated shortcoming, however, is that an NFC transaction will likely cause interference with the frequency-modulated voice signals that the user of the phone is hearing. Thus, there remains a need for a way to minimize the negative impact that an NFC transaction might have on the user experience of an audio telephone call.

BRIEF SUMMARY

Embodiments of the present invention relate to a system and method for handling near field communication transactions. A system for determining a frequency modulated audio output of a mobile communication device during a near field communication transaction includes a transceiver providing a first frequency modulated audio signal. The device also is configured to determine when the near field communication transaction is occurring; a memory configured to store a replacement sound; and a selection circuit coupled with the transceiver and the memory to select the replacement sound when the near field communication transaction is occurring and select the first frequency modulated audio signal when the near field communication transaction is not occurring. There is also a signal path coupled with the selection circuit and configured to provide a second frequency modulated signal based on the selection circuit. In this way, the replacement sound is the audio output when the NFC transaction is occurring and the regular audio is output when the NFC transaction is not occurring.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of embodiments of the invention are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
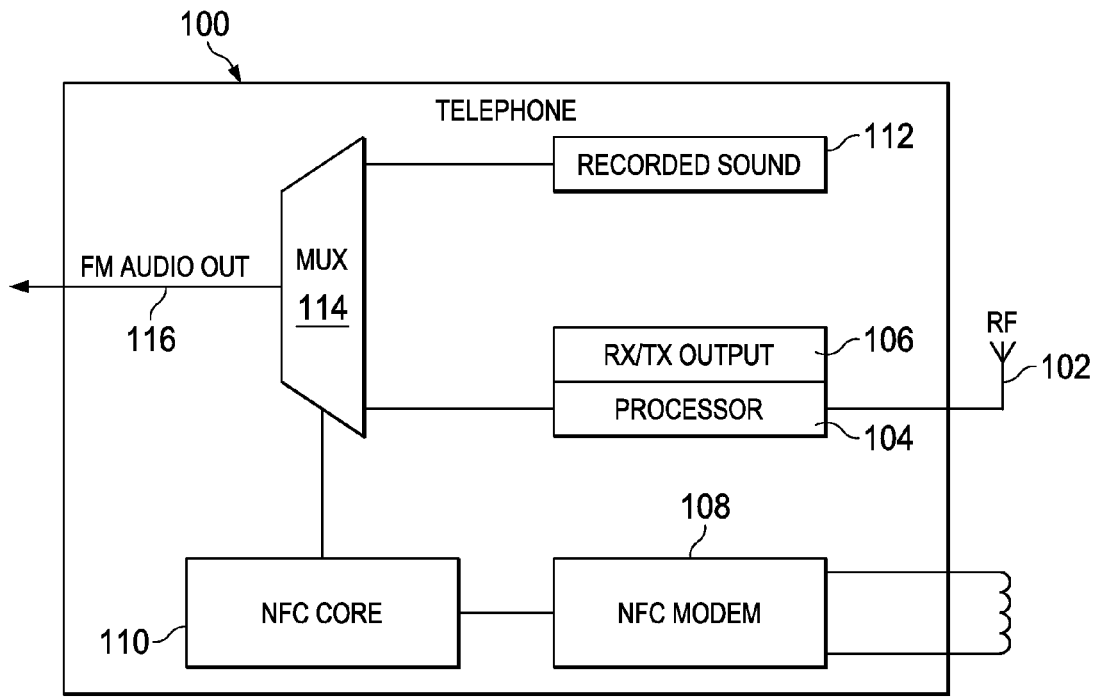
FIG. 1 depicts an exemplary architecture of a communications device capable of NFC transactions in accordance with the principles of the present invention.

FIG. 1 depicts an exemplary architecture of a communications device capable of NFC transactions in accordance with the principles of the present invention. A telephone 100 is shown, such as a mobile telephone, which is capable of cellular communications using the antenna 102. Such a telephone 100 includes a number of elements that are not shown in FIG. 1. However, there is typically a processor 104 that receives RF signals and converts them into audio output and receives audio input and coverts it into RF signals to transmit. These frequency-modulated audio signals are depicted in FIG. 1 as the RX/TX output 106. This element refers to the FM output from the regular audio RX/TX chain of the phone.

The phone 100 of FIG. 1 also includes the capability of performing NFC transactions. There are passive and active transactions within the NFC protocol and it is envisioned that the phone 100 can handle both types of transactions as necessary. As such, there is a NFC modem 108 and an NFC core 110 within the phone 100. The NFC modem 108 either produces a magnetic field or detects the presence of a magnetic field or NFC object.

Using the NFC protocol, the NFC core 110 controls the exchange of information which can be one directional transmission from the phone, one directional transmission to the phone, or bi-directional communication. The NFC protocol not only specifies how data is to be exchanged during a transaction but also defines certain control information such as when a transaction is initiated, when a transaction is complete, and when a transaction is unsuccessful.

Also included in the phone of FIG. 1 is a recorded sound 112. This sound can be stored in an audio format that can be a set duration in length or can be looped so as to have a variable duration. The multiplexer 114 is used to control what signal is used as the FM audio output 116. For example, during an NFC transaction, the NFC core can signal the mux 114 such that the recorded sound is output. When no NFC transaction is ongoing, then the normal RX/TX output is fed through the mux 114 and provides the FM audio output 116.

In this way, when an NFC transaction is taking place, the normal FM audio output is not provided to the user. As a result, the anticipated degraded signal that might occur from the interference with the NFC signal will not be experienced by the user. As one example, the NFC core 110 can signal the initiation of an NFC transaction and send a control signal to the mux 114. When the NFC core 110 detects the end of the NFC transaction, then the control signal to the mux can be de-energized. Alternatively, an estimate for the length of typical NFC transactions can be used to control the length of time the mux control signal is energized. Once the signal is energized a timing circuit starts and de-energizes the signal (e.g., after 500 ms) without requiring and end-of-transaction detection from the NFC core.

Figure 2:
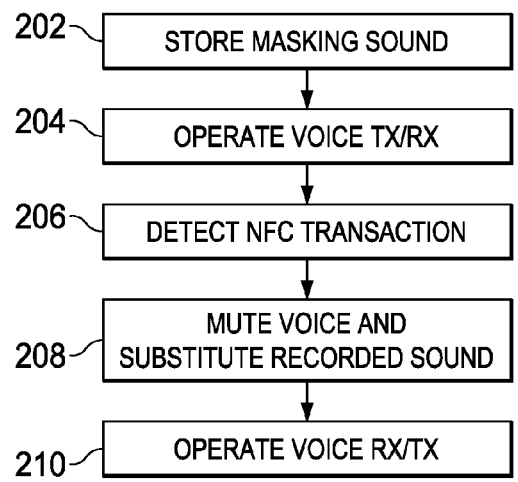
FIG. 2 depicts a flowchart of a method of handling NFC transactions in accordance with the principles of the present invention.

FIG. 2 depicts a flowchart of a method of handling NFC transactions in accordance with the principles of the present invention.

In step 202 a masking sound is stored in an available storage location so that it can be applied to the FM audio output of a telephone. One of ordinary skill will recognize that the recorded signal can be stored in a number of different types of memory and have varied durations without departing from the scope of the present invention. As for the sound itself, a beep-type sound would be helpful in that it could not be mistaken for unintelligible conversation. However, other types of noises or sounds could just as easily be stored without departing from the scope of the present invention.

In step 204, the phone operates as normal and the processor provides audio output and receives audio input so that a user can use the phone for voice communication. However, when in step 206 the initiation of an NFC transaction is detected, then a control signal can be energized. This control signal results, as shown in step 208, in the muting of the regular audio RX/TX chain and substitutes the pre-recorded sound. In this way, if the NFC transaction has interfered with and degraded the FM audio output, that degraded signal is not experienced by the user who, instead, hears the pre-recorded sound. One way to accomplish this functionality is to have a multiplexer that has the regular audio RX/TX chain as one input and the pre-recorded sound as the other input. The control signal determines which input is fed through the multiplexer to its output.

Once the NFC transaction is over, the control signal can be de-energized so that the FM output from the regular audio RX/TX chain is output, in step 210.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. Also, the term "exemplary" is meant to indicate that some information is being provided as an example only as is not intended to mean that that information is somehow special or preferred. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for determining a frequency modulated audio output of a mobile communication device during a near field communication transaction, comprising:
   storing a replacement sound;
   providing, as the frequency modulated audio output, frequency modulated audio output from a transceiver of the mobile communication device when a near field communication transaction is not occurring; and
   providing, as the frequency modulated audio output, the replacement sound when a near field communication transaction is occurring.

2. The method of claim 1, further comprising:
   detecting a start of the near field communication transaction.

3. The method of claim 2, further comprising:
   detecting an end of the near field communication transaction.

4. The method of claim 1, further comprising:
   detecting a start of the near field communication transaction;
   after detecting the start, providing, as the frequency modulated audio output, the replacement sound;
   detecting an end of the near field communication transaction; and
   after detecting the end, providing, as the frequency modulated audio output, frequency modulated audio output from a transceiver of the mobile communication device.

5. The method of claim 1 further comprising:
   providing the replacement sound to a first input of a multiplexer;
   providing the frequency modulated audio output from the transceiver as a second input to the multiplexer; and
   generating a control signal that selects between the two inputs in order to generate an output of the multiplexer.

6. A system for determining a frequency modulated audio output of a mobile communication device during a near field communication transaction, comprising:
   a transceiver providing a first frequency modulated audio signal;
   a detector configured to determine when the near field communication transaction is occurring;
   a memory configured to store a replacement sound;

a selection circuit coupled with the transceiver and the memory to select the replacement sound when the near field communication transaction is occurring and select the first frequency modulated audio signal when the near field communication transaction is not occurring; and a signal path coupled with the selection circuit and configured to provide a second frequency modulated signal based on the selection circuit.

7. The system of claim 6, wherein the selection circuit has a first state in which the replacement sound is selected and a second state in which the first frequency modulated audio signal is selected.

8. The system of claim 6, wherein the selection circuit includes:

a multiplexer having a first input and a second input, and an output coupled to the signal path.

9. The system of claim 8 wherein:

the memory is coupled with the first input of the multiplexer; and the first frequency modulated audio signal is coupled with the second input.

10. The system of claim 6, wherein the detector provides a control signal that determines the operation of the selection circuit.

11. The system of claim 10, wherein the detector detects an initiation of the near field communication transaction and an end of the near field communication transaction.

12. The system of claim 11, wherein:

the detector is configured to assert the control signal from about the initiation of the near field communication transaction and de-assert the control signal at the end of the near field communication transaction;

and the selection circuit is configured to select the replacement sound while the control signal is asserted.

13. The system of claim 11, wherein the selection circuit is configured to select the first frequency modulated audio signal when the control signal is not asserted.

14. The system of claim 10, wherein the detector includes a processor configured to communicate in accordance with a standard protocol for near field communication transactions.

\* \* \* \* \*